US005997060A

United States Patent [19]

Sperduto

[11] Patent Number: 5,997,060

[45] Date of Patent: Dec. 7, 1999

[54] CHUTE SHOVEL

[76] Inventor: Anthony V. Sperduto, 1553 Meridian Ave., Miami Beach, Fla. 33139

[21] Appl. No.: 08/909,475

[22] Filed: Aug. 11, 1997

[51] Int. Cl.[6] .................... A01B 1/02; B08B 9/02

[52] U.S. Cl. .................... 294/1.1; 15/104.05; 294/49

[58] Field of Search .................... 294/1.1, 9–14, 294/49, 51, 54.5, 55, 61; 15/104.001, 104.05, 104.068, 104.069, 249.2, 236.01; 56/400.01, 400.04, 400.11; 100/56, 229 R, 229 A; 141/73, 390, 391; 193/33, 34; 248/689, 690, 693; D8/10

[56] References Cited

U.S. PATENT DOCUMENTS

| | | | |
|---|---|---|---|
| D. 296,834 | 7/1988 | McDermott | D34/28 |
| 1,290,433 | 1/1919 | Walker | 248/690 |
| 2,066,886 | 1/1937 | Henn | 248/690 |
| 2,484,267 | 10/1949 | Bower | 15/104.068 |
| 3,929,060 | 12/1975 | Burke | 100/229 R X |
| 4,190,920 | 3/1980 | Fikkers | 294/61 X |
| 4,629,233 | 12/1986 | Pfisterer | 294/55 X |
| 4,802,256 | 2/1989 | Usimaki | 15/104.069 |
| 5,487,530 | 1/1996 | McCullough | 254/131.5 |
| 5,491,862 | 2/1996 | Hurley | 15/104.068 |
| 5,533,768 | 7/1996 | Mitchell | 294/54.5 |
| 5,551,576 | 9/1996 | Importico | 209/705 |
| 5,765,614 | 6/1998 | Kardosh | 141/390 |

*Primary Examiner*—Johnny D. Cherry
*Attorney, Agent, or Firm*—Richard L. Miller, P.E.

[57] ABSTRACT

A chute shovel that facilitates manual pushing of garbage down a garbage chute in a wall, and which is replaceably mounted to the wall adjacent the garbage chute in the wall. The chute shovel includes a handle and a push plate affixed to the handle. The push plate has a center with an aperture therein that perpendicularly receives the handle, which is maintained therein by a nut. The push plate further has corners that are bent downwardly in opposition to the handle so as to prevent the push plate from sliding laterally on the garbage when the chute shovel is in use, wherein the corners of the push plate are generally semi-circular-shaped so as to prevent puncturing the garbage when the chute shovel is in use. The chute shovel further includes a chain that extends at one end from the handle, and at another end is affixed to a spring clip that is mounted to the wall adjacent the garbage chute and which replaceably retains the handle therein when the chute shovel is not in use so as have the chute shovel ready for use without the chute shovel being misplaced.

6 Claims, 1 Drawing Sheet

CHUTE SHOVEL

BACKGROUND OF THE INVENTION

1. Field of the Invention

The present invention relates to a shovel. More particularly, the present invention relates to a chute shovel.

2. Description of the Prior Art

Numerous innovations for chutes and shovels have been provided in the prior art that will be described. Even though these innovations may be suitable for the specific individual purposes to which they address, however, they differ from the present invention.

FOR EXAMPLE, U.S. Pat. No. Des. 296,834 to McDermott teaches the ornamental design for a trash chute.

ANOTHER EXAMPLE, U.S. Pat. No. 5,487,530 to McCullough teaches a shoveling aid for a shovel that includes an elongated bracing member releasably attachable to the handle of the shovel at a selected position away from the shovel blade to permit the shovel to be levered with the aid to lift a load carried by the blade. The bracing member includes a pipe section which has upper and lower openings on opposed sides. A sleeve coupled to the pipe section in the upper opening receives the handle at a predetermined angle relative to the pipe section.

STILL ANOTHER EXAMPLE, U.S. Pat. No. 5,533,768 to Mitchell teaches a shoveling tool that has a flexible portion at the base of the handle that helps prevent the risk of injury when shoveling by absorbing the initial shock when digging or by adjusting gradually to a different load when shoveling. This tool, which is preferably telescopic, is particularly useful for removing snow and ice.

FINALLY, YET ANOTHER EXAMPLE, U.S. Pat. No. 5,551,576 to Importico teaches a system to separate and store trash which has been segregated into various categories for use in a multi-floor building. The system has a vertical waste chute with at least one access door to the chute located at each floor of the building. The chute has an upper and lower portion and two paths therethrough. The first path permits vertical disposal of the trash and the second path is angled to the first to permit designated trash to follow a different pathway for disposal. The system further includes a diverter located adjacent the lower portion of the chute for diverting the path of the trash placed into the chute from a first location containing a plurality of trash receptacles located on a platform to a second location having at least one trash receptacle, such as a trash compactor. The system also includes a receptacle mover to move a selected trash receptacle beneath the chute to receive a particular category of trash deposited into the chute. A controller controls the receptacle mover and includes a selector to select the particular category of trash to be deposited into the access door and an indicator to indicate the category selected. The selector and indicator are located adjacent each access door. The controller is operatively connected to the receptacle mover to selectively control the receptacle mover. The system also includes a dispenser to place an empty receptacle onto the platform to replace a receptacle which is removed from the platform after the receptacle is filled with trash. The system further includes a replacing mechanism to remove a receptacle filled with trash from the platform to allow the dispenser to dispense an empty receptacle onto the platform. The replacing mechanism includes a sensor to sense when a receptacle on the platform is filled with trash and needs to be replaced with an empty receptacle. Each access door to the chute includes a locking mechanism connected to each door to lock it while the receptacle moving mechanism is in motion and to prevent another person from depositing trash into another access door.

It is apparent that numerous innovations for chutes and shovels have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a shovel chute that avoids the disadvantages of the prior art.

ANOTHER OBJECT of the present invention is to provide a shovel chute that is simple and inexpensive to manufacture.

STILL ANOTHER OBJECT of the present invention is to provide a shovel chute that is simple to use.

BRIEFLY STATED, YET ANOTHER OBJECT of the present invention is to provide a chute shovel that facilitates manual pushing of garbage down a garbage chute in a wall, and which is replaceably mounted to the wall adjacent the garbage chute in the wall. The chute shovel includes a handle and a push plate affixed to the handle. The push plate has a center with an aperture therein that perpendicularly receives the handle, which is maintained therein by a nut. The push plate further has corners that are bent downwardly in opposition to the handle so as to prevent the push plate from sliding laterally on the garbage when the chute shovel is in use, wherein the corners of the push plate are generally semi-circular-shaped so to as prevent puncturing the garbage when the chute shovel is in use. The chute shovel further includes a chain that extends at one end from the handle, and at another end is affixed to a spring clip that is mounted to the wall adjacent the garbage chute and which replaceably retains the handle therein when the chute shovel is not in use so as have the chute shovel ready for use without the chute shovel being misplaced.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures on the drawing are briefly described as follows.

LIST OF REFERENCE NUMERALS UTILIZED IN THE DRAWING

Figure 1:
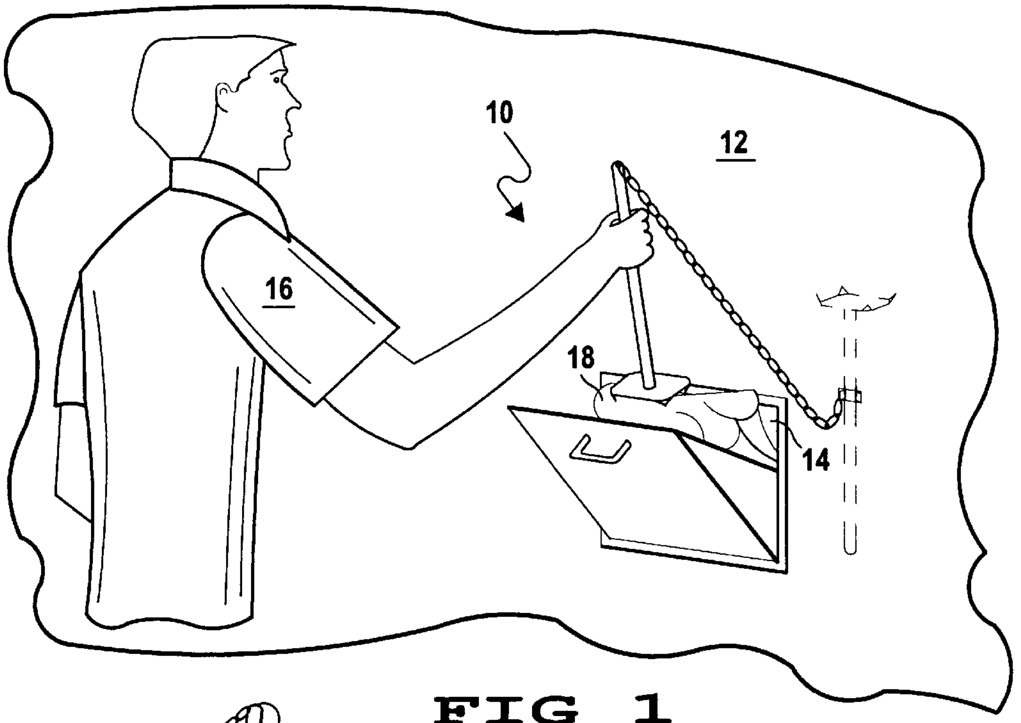
FIG. 1 is a diagrammatic perspective view of the present invention in use pushing garbage down a garbage chute.

10 chute shovel of the present invention
12 wall
14 garbage chute in wall 12
20 handle

22 proximal end of handle 20
24 distal end of handle 20
26 push plate
28 aperture in center of push plate 26
30 nut
32 corners of push plate 26
34 chain
36 spring clip

DESCRIPTION OF THE PREFERRED EMBODIMENT

Referring now to the figures in which like numerals indicate like parts, and particularly to FIG. 1, the chute shovel of the present invention is shown generally at 10 replaceably removed from a wall 12, adjacent a garbage chute 14 in the wall 12, and being utilized by a user 16 to facilitate the manual pushing of garbage 18 down the garbage chute 14 in the wall 12.

Figure 2:
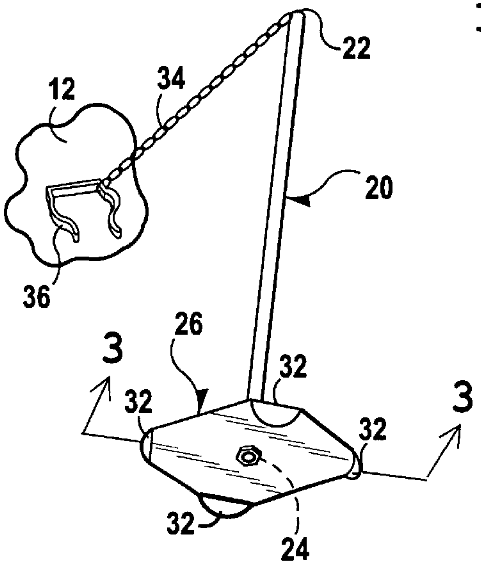
FIG. 2 is an enlarged diagrammatic perspective view of the present invention.
Figure 3:
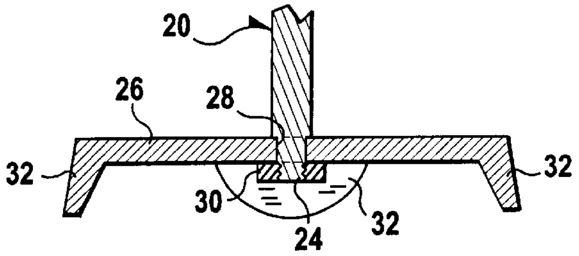
FIG. 3 is an enlarged cross sectional view, with parts broken away, taken on line 3—3 in FIG. 2.

The configuration of the chute shovel 10 can best be seen in FIGS. 2 and 3, and as such will be discussed with reference thereto.

The chute shovel includes a handle 20 that is slender, la elongated, and generally cylindrically-shaped. The handle 20 has a proximal end 22 that is hemispherically-shaped so as to eliminate any sharp edges thereat, and a distal end 24 that is reduced and threaded.

The chute shovel further includes a push plate 26 that is thin, flat, and generally rectangular-shaped. The push plate 26 has a center with an aperture 28 therein that perpendicularly receives the distal end 24 of the handle 20 which is maintained therein by a nut 30.

The push plate 26 further has corners 32 that are bent downwardly in opposition to the handle 20 so as to prevent the push plate 26 from sliding laterally on the garbage 18 when the chute shovel 10 is in use.

The corners 32 of the push plate 26 are generally semi-circular-shaped so as prevent puncturing the garbage 18 when the chute shovel 10 is in use.

The chute shovel 10 further includes a chain 34 that extends at one end from the proximal end 22 of the handle 20, and at another end is affixed to a spring clip 36 that is mounted to the wall 12 adjacent the garbage chute 14 and which replaceably retains the handle 20 therein when the chute shovel 10 is not in use so as have the chute shovel 10 ready for use without the chute shovel 10 being misplaced.

It will be understood that each of the elements described above, or two or more together, may also find a useful application in other types of constructions differing from the types described above.

While the invention has been illustrated and described as embodied in a chute shovel, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A chute shovel that facilitates manual pushing of garbage down a garbage chute in a wall and which is replaceably mounted to the wall adjacent the garbage chute in the wall, comprising:

a) a handle; and b) a push plate affixed to said handle, wherein said push plate further has corners that are bent downwardly in opposition to said handle so as to prevent said push plate from sliding laterally on the garbage when said chute shovel is in use.

2. The shovel as defined in claim 1, wherein said corners of said push plate are generally semi-circular-shaped so as prevent puncturing the garbage when said chute shovel is in use.

3. A chute shovel that facilitates manual pushing of garbage down a garbage chute in a wall and which is replaceably mounted to the wall adjacent the garbage chute in the wall, comprising:

a) a handle; and b) a push plate affixed to said handle, wherein said handle has a proximal end that is hemispherically-shaped so as to eliminate any sharp edges thereat, and a distal end that is reduced and threaded; further comprising a chain that extends at one end from said proximal end of said handle, and at another end is affixed to a spring clip that is mounted to the wall adjacent the garbage chute and which replaceably retains said handle therein when said chute shovel is not in use so as have said chute shovel ready for use without said chute shovel being misplaced.

4. The shovel as defined in claim 3, wherein said handle is slender, elongated, and generally cylindrically-shaped.

5. The shovel as defined in claim 3, wherein said push plate is flat, and generally rectangular-shaped.

6. The shovel as defined in claim 3, wherein said push plate has a center with an aperture therein that perpendicularly receives said distal end of said handle which is maintained therein by a nut.

* * * * *